United States Patent
Inoue et al.

(10) Patent No.: US 11,761,511 B2
(45) Date of Patent: Sep. 19, 2023

(54) MOUNT BUSH

(71) Applicant: HONDA MOTOR CO., LTD., Tokyo (JP)

(72) Inventors: Toshio Inoue, Wako (JP); Yuho Ito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/680,645

(22) Filed: Feb. 25, 2022

(65) Prior Publication Data

US 2022/0299085 A1    Sep. 22, 2022

(30) Foreign Application Priority Data

Mar. 16, 2021 (JP) .................................. 2021-042095

(51) Int. Cl.
*F16F 13/14* (2006.01)
*F16F 13/30* (2006.01)

(52) U.S. Cl.
CPC ............ *F16F 13/305* (2013.01); *F16F 13/14* (2013.01); *B60G 2204/14* (2013.01); *B60G 2204/41062* (2013.01); *F16F 2222/06* (2013.01); *F16F 2224/045* (2013.01); *F16F 2228/066* (2013.01)

(58) Field of Classification Search
CPC .. F16F 9/53; F16F 13/14; F16F 13/305; F16F 2222/06; F16F 2224/045; F16F 2228/066; B60G 2204/14; B60G 2204/41062
See application file for complete search history.

(56) References Cited

U.S. PATENT DOCUMENTS

| 5,050,850 | A * | 9/1991 | Noguchi | F16F 13/1427 188/267.1 |
|---|---|---|---|---|
| 11,215,253 | B2 * | 1/2022 | Ito | F16F 1/3615 |
| 11,215,261 | B2 * | 1/2022 | Ito | F16F 9/3481 |
| 11,221,052 | B2 * | 1/2022 | Inoue | F16F 13/14 |
| 11,274,727 | B2 * | 3/2022 | Inoue | F16F 13/305 |
| 2020/0109761 | A1 * | 4/2020 | Inoue | H01F 1/447 |
| 2020/0109762 | A1 * | 4/2020 | Inoue | H01F 7/0231 |
| 2020/0263751 | A1 | 8/2020 | Ito et al. | |
| 2020/0263755 | A1 * | 8/2020 | Ito | F16F 13/28 |
| 2020/0271187 | A1 * | 8/2020 | Ito | F16F 9/535 |

FOREIGN PATENT DOCUMENTS

JP    2020-133700 A    8/2020

* cited by examiner

*Primary Examiner* — Thomas W Irvin
(74) *Attorney, Agent, or Firm* — Rankin, Hill & Clark LLP

(57) ABSTRACT

A mount bush includes: an inner tubular member; an outer tubular member arranged coaxially with the inner tubular member and surrounding an outer periphery of the inner tubular member with a clearance; and an elastic member connecting the inner tubular member with the outer tubular member, wherein the inner tubular member includes: an inner yoke having a coil therein; and an outer yoke coaxially coupled with the inner yoke at a radially outer position than the coil, and the elastic member has a first and second fluid chambers, facing each other across an axis of the inner tubular member and having magnetic fluid encapsulated therein, whose viscosity varies by a magnetic field, wherein the outer yoke has a communication passage communicating the first fluid chamber with the second fluid chamber, and is provided with a permanent magnet to generate a magnetic field in the communication passage.

8 Claims, 5 Drawing Sheets

MOUNT BUSH

CROSS-REFERENCE TO RELATED APPLICATION

This application claims the benefit of priority to Japanese Patent Application No. 2021-042095 filed on Mar. 16, 2021, the disclosures of all of which are hereby incorporated by reference in their entireties.

TECHNICAL FIELD

The present invention relates to a mount bush mounted to a suspension arm, for example.

BACKGROUND OF THE INVENTION

Japanese Application Publication No. 2020-133700 A (hereinafter, referred to as Patent Document 1) discloses a bushing assembly provided in a lower arm of a suspension. The bushing assembly has pairs of fluid chambers (a pair of first fluid chambers and a pair of second fluid chambers) provided in an elastic member connecting an inner tubular member with an outer tubular member, members of each pair facing each other across the inner tubular member. The pairs of fluid chambers have magnetic fluid encapsulated therein.

The inner tubular member has coils arranged therein to generate magnetic fields in a communication passage connecting the pair of fluid chambers with each other.

SUMMARY

However, with the bushing assembly disclosed in Patent Document 1, when iron powder in the magnetic fluid is dominantly distributed in one of the pair of fluid chambers, there is less variation in viscosity of the magnetic fluid, to have a risk of failing to be varied to a desired damping force.

The present invention has been made in view of the above problem, and is intended to provide a mount bush capable of preventing iron powder in the magnetic fluid from being dominantly distributed in one of the pair of fluid chambers.

In order to achieve the above-described objective, a mount bush according to the present invention includes: an inner tubular member in a tubular shape; an outer tubular member in a tubular shape arranged coaxially with the inner tubular member and surrounding an outer periphery of the inner tubular member with a clearance; and an elastic member connecting the inner tubular member with the outer tubular member, wherein the inner tubular member includes: an inner yoke in a tubular shape having a coil therein; and an outer yoke in a tubular shape coaxial with the inner yoke and coupled with the inner yoke at a radially outer position than the coil, and the elastic member has a first fluid chamber and a second fluid chamber, facing each other across an axis of the inner tubular member and having magnetic fluid encapsulated therein, whose viscosity varies by a magnetic field, wherein the outer yoke has a communication passage communicating the first fluid chamber with the second fluid chamber, and is provided with a permanent magnet to generate a magnetic field in the communication passage.

The present invention provides a mount bush capable of preventing iron powder in the magnetic fluid from being dominantly distributed in one of the pair of fluid chambers.

DETAILED DESCRIPTION

Hereinbelow, embodiments of the present invention are described in detail, with reference to the drawings as required.

First Embodiment

Figure 1:
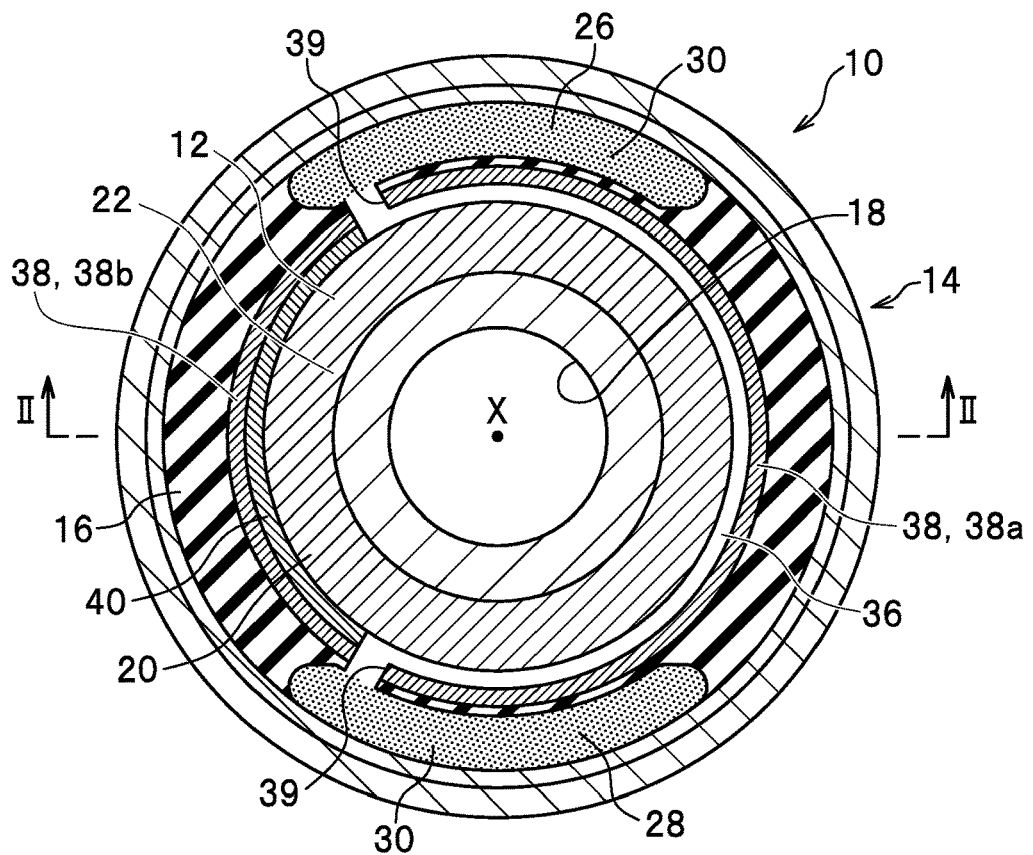
FIG. 1 is a cross-sectional view of a mount bush, perpendicular to an axis thereof, according to a first embodiment of the present invention.

As shown in FIG. 1, a mount bush 10 according to a first embodiment of the present invention includes: an inner tubular member 12 in a tubular shape; an outer tubular member 14 in a tubular shape arranged coaxially with the inner tubular member 12 to surround an outer periphery of the inner tubular member 12 with a clearance; and an elastic member 16 connecting the inner tubular member 12 with the outer tubular member 14.

The inner tubular member 12 is formed in a center thereof with a bolt hole 18 penetrating along an axis X, which extends in an up-down direction. In addition, the inner tubular member 12 includes: an inner yoke 22 in a tubular shape having a coil 20 therein; and an outer yoke 24 (see FIG. 2) in a tubular shape coaxial with the inner yoke 22 and coupled with the inner yoke 22 at a radially outer position than the coil 20. The coil 20 is made by winding a coated copper wire, not shown, substantially coaxially with the inner tubular member 12, for example.

Figure 2:
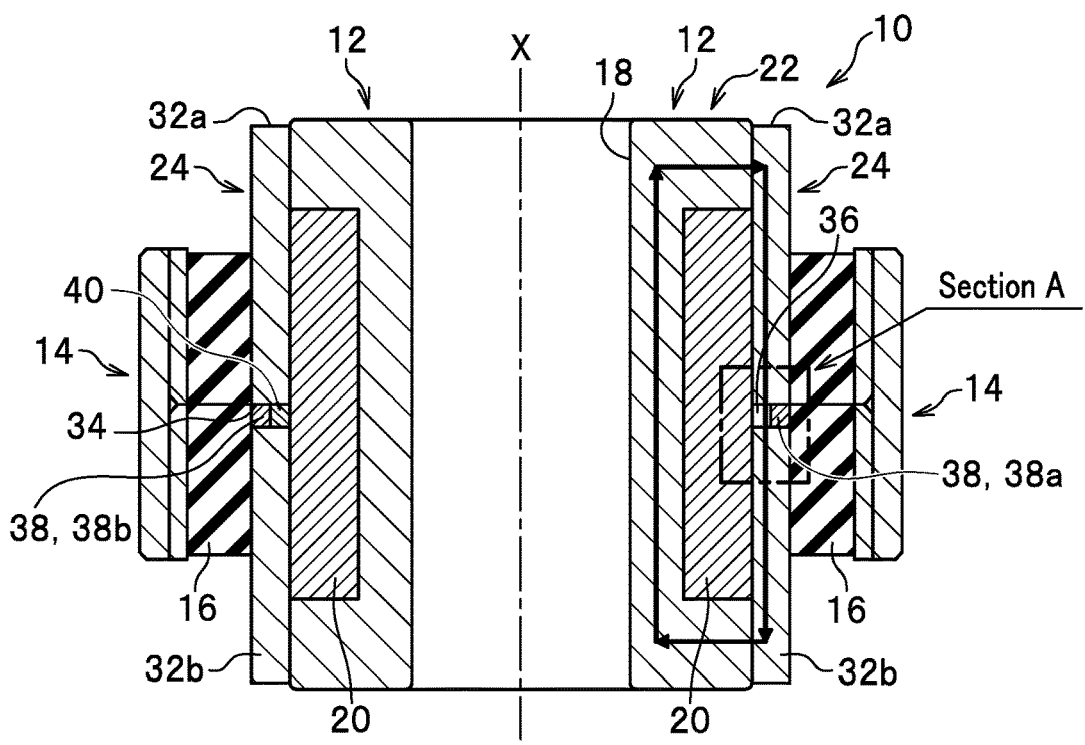
FIG. 2 is a cross-sectional view, taken along a line II-II in FIG. 1.

The elastic member 16 is formed of a rubber elastic body, for example, and has a first fluid chamber 26 and a second fluid chamber 28, facing each other across the axis X. The first fluid chamber 26 and second fluid chamber 28 have magnetic fluid 30 (see halftone dots) encapsulated therein, whose viscosity varies by a magnetic field. Note that the dimensions in the direction of the axis X of the outer tubular member 14 and elastic member 16 are shorter in the first embodiment than that of the inner tubular member 12, as shown in FIG. 2.

The outer yoke 24 is arranged coaxially along the axis X, and includes a pair of magnetic bodies 32a, 32b, which are away in the direction of the axis X from each other. The magnetic body 32a on one side and the magnetic body 32b on the other side, along the axis X, define a gap 34 therebetween. A communication passage 36, a permanent magnet 38, and a non-magnetic body 40 are arranged in the gap 34 so as to be defined/held between the pair of magnetic bodies 32a, 32b.

The communication passage 36 is provided in the gap 34, to circumferentially communicate the first fluid chamber 26 with the second fluid chamber 28. The communication passage 36 has a substantially arc shape, when viewed in the direction of the axis X, and is provided radially inside in the gap 34.

In addition, the permanent magnet 38 is provided in the gap 34, to generate a magnetic field in the communication passage 36. The permanent magnet 38 includes a larger arc part 38a having a larger arc and a smaller arc part 38b having a smaller arc, as viewed in the direction of the axis X. Communication holes 39 are provided between ends in a circumferential direction of the larger arc part 38a and ends in a circumferential direction of the smaller arc part 38b, to communicate the first fluid chamber 26 and second fluid chamber 28 with the communication passage 36. The communication passage 36 is provided on a radially inner side of the larger arc part 38a, along an inner circumference of the larger arc part 38a. The non-magnetic body 40 is arranged on a radially inner side of the smaller arc part 38b, along an inner circumference of the smaller arc part 38b.

A magnetic force of the permanent magnet 38 is set smaller than the maximum magnetic force by the coil 20. Additionally, the magnetic force of the permanent magnet 38 is set to one causing viscosity of the magnetic fluid 30 to be at a midpoint in the variable range of the viscosity. Advantageous effects of these settings are described below in detail.

The non-magnetic body 40 has an arc shape, when viewed in the direction of the axis X, and is made of a non-magnetic material such as aluminum. The non-magnetic body 40 is arranged radially inside in the gap 34, and is continuous so as to have a starting point and an ending point thereof circumferentially aligned with those of the smaller arc part 38b of the permanent magnet 38.

The mount bush 10 of the present embodiment is configured as described above, and advantageous effects of the mount bush 10 is described next.

In the present embodiment, the inner tubular member 12 includes: the inner yoke 22 in a tubular shape having the coil 20 therein; and the outer yoke 24 in a tubular shape coaxial with the inner yoke 22 and coupled with the inner yoke 22 at a radially outer position than the coil 20. The outer yoke 24 has the communication passage 36 communicating the first fluid chamber 26 with the second fluid chamber 28, and is provided with the permanent magnet 38 to generate a magnetic field within the communication passage 36.

Figure 3:
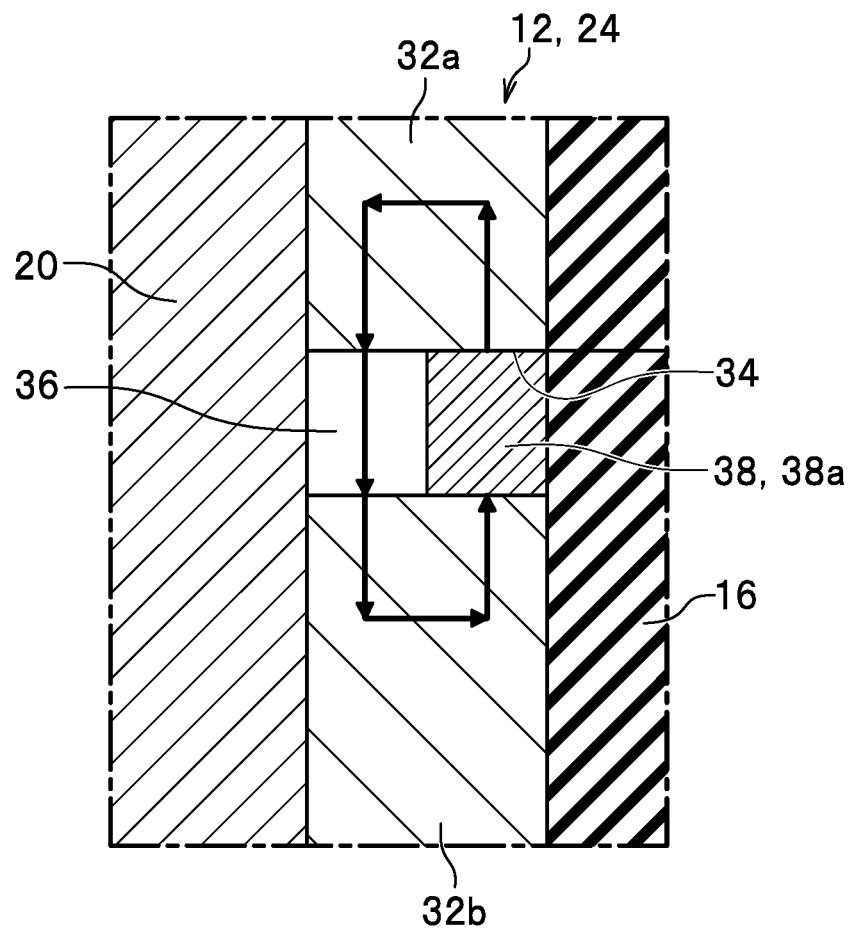
FIG. 3 is an enlarged cross-sectional view of a section A in FIG. 2.

In the present embodiment, arranging the permanent magnet 38 in the outer yoke 24 provided with the communication passage 36 allows for acting a magnetic field in the communication passage 36 by the permanent magnet 38, even in a non-energized state having no magnetic field generated by the coil 20. Accordingly, the present embodiment can prevent iron powder from moving between the first fluid chamber 26 and the second fluid chamber 28. As a result, the present embodiment provides the mount bush 10 capable of preventing iron powder in the magnetic fluid 30 from being dominantly distributed in either one of the first fluid chamber 26 and second fluid chamber 28. Note that an arrowed solid line in FIG. 3 indicates a magnetic flux by the permanent magnet 38.

In the present embodiment, the outer yoke 24 includes the pair of magnetic bodies 32a, 32b, which are away in the direction of the axis X of the inner tubular member 12 from each other, across the communication passage 36. The permanent magnet 38 (smaller arc part 38b) is arranged so as to be held between the pair of magnetic bodies 32a, 32b.

If the pair of magnetic bodies 32a, 32b are connected with each other by a magnetic body, there is a risk that a magnetic path is more likely formed in the connecting portion and a magnetic path is less likely formed in the communication passage 36. This requires a non-magnetic body to be held at a portion between the pair of magnetic bodies 32a, 32b, other than the communication passage 36, and the present embodiment partly replaces such non-magnetic body with the permanent magnet 38 (smaller arc part 38b), to simplify the structure.

In the present embodiment, when a minute negative electric current (minute electric current flowing in an opposite direction to the flux of the permanent magnet 38) is flown into the coil 20, for example, the coil 20 is excited in the reverse direction from the magnetizing direction of the permanent magnet 38, to have the magnetic fluxes interfering with, and canceling, each other. As a result, the viscosity of the magnetic fluid 30 flowing through the communication passage 36 becomes minimum.

In addition, when a current is not flown through the coil 20, the present embodiment allows iron powder in the magnetic fluid 30 to be moved by a magnetic force of the permanent magnet 38 so that the iron powder is not precipitated. Accordingly, the present embodiment prevents iron powder in the magnetic fluid 30, flowing through the communication passage 36, from being dominantly distributed in one of the pair of fluid chambers, when the coil 20 is not energized.

Further, when the maximum positive current (the maximum current flowing in the same direction as the magnetic flux by the permanent magnet 38) is flown through the coil 20, the present embodiment has the coil 20 energized in the same direction as the magnetization direction of the permanent magnet 38 to cause the magnetic fluid 30 to have the maximum viscosity.

Still further, the present embodiment has the magnetic force of the permanent magnet 38 set smaller than the maximum magnetic force of the coil 20. When a minute negative electric current (minute electric current flowing in an opposite direction to the flux of the permanent magnet 38) is flown into the coil 20, the present embodiment causes the magnetic field by the permanent magnet 38 to be canceled by the magnetic field by the coil 20, to prevent any magnetic path from being formed in the communication passage 36. As a result, the present embodiment can be used, even with the magnetic fluid 30 having the lowest viscosity. This broadens a range of damping force controlled by the mount bush 10.

Still further, the present embodiment has the magnetic force of the permanent magnet 38 set to one causing viscosity of the magnetic fluid 30 to be at a midpoint in the variable range of the viscosity. This allows an exciting current supplied to the coil 20 to be low, no matter when the viscosity of the magnetic fluid is either increased or decreased.

Note that "a midpoint in the variable range of the viscosity" may be a midpoint in a range of the maximum viscosity to the minimum viscosity of the magnetic fluid, or may be a midpoint in a control range of damping force required for a damper (mount bush, for example). The midpoint is preferably a midpoint in a control range of damping force required for a damper (mount bush, for example).

Second Embodiment

Next, a mount bush 10a according to a second embodiment of the present invention is described. Note that the same components as those of the mount bush 10 of the first embodiment are denoted by the same reference numerals in the following embodiment, and detailed descriptions thereof are omitted.

Figure 4:
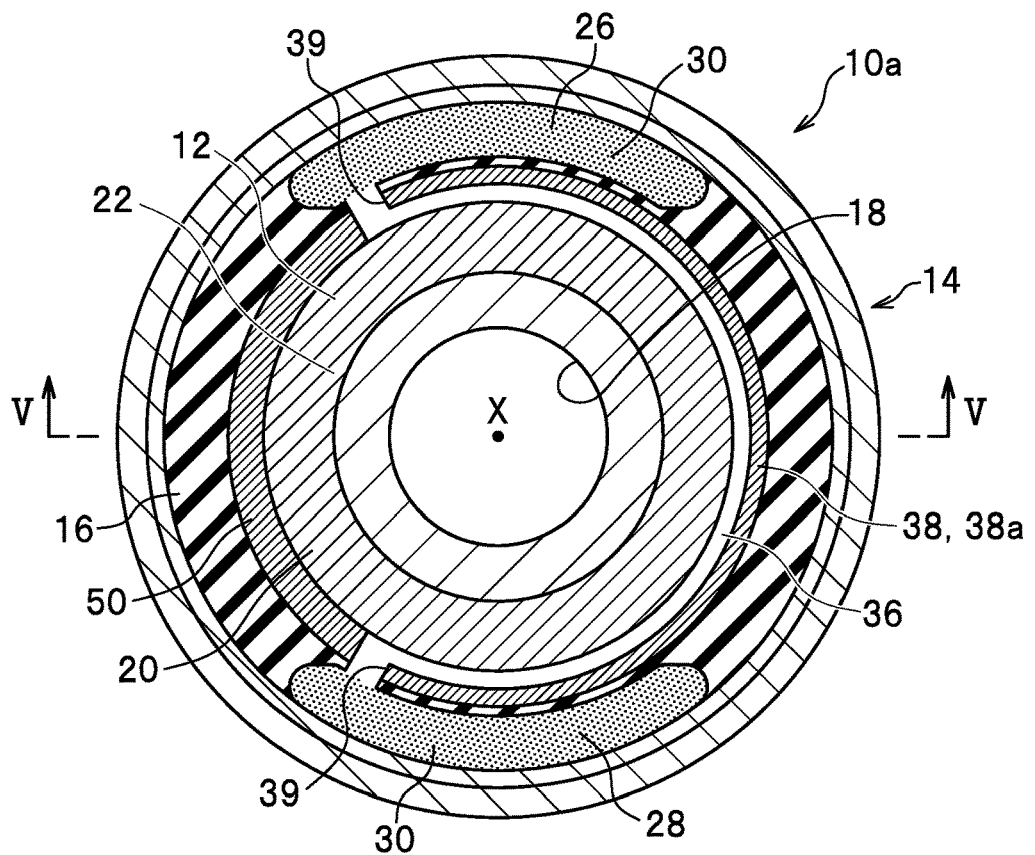
FIG. 4 is a cross-sectional view of a mount bush, perpendicular to an axis thereof, according to a second embodiment of the present invention.
Figure 5:
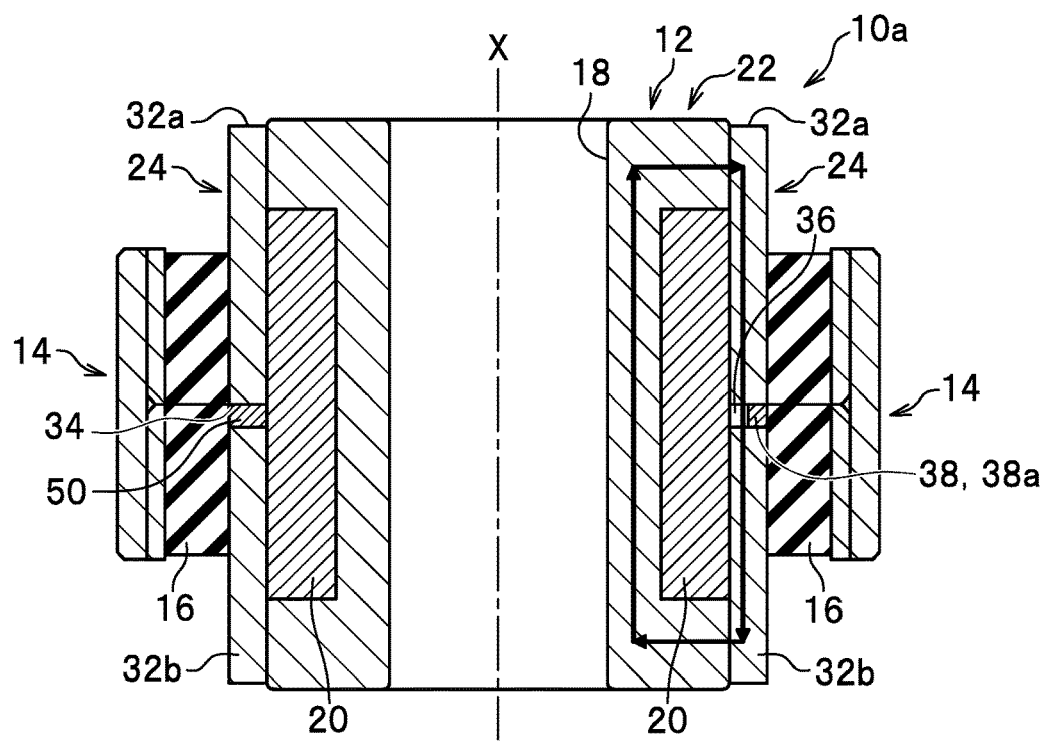
FIG. 5 is a cross-sectional view, taken along a line V-V in FIG. 4.

The mount bush 10a according to the second embodiment is different from the first embodiment on the point that the mount bush 10a does not have the non-magnetic body 40 arranged in the gap 34, and has only a permanent magnet 50 arranged in the gap 34, as shown in FIGS. 4 and 5. The permanent magnet 50 is formed to have the smaller arc part 38b of the permanent magnet 38 in the first embodiment integrally coupled with the non-magnetic body 40 in the first embodiment. Note that the larger arc part 38a of the permanent magnet 38 in the first embodiment remains the same even in the second embodiment.

The second embodiment has only the communication passage 36 and the permanent magnet 50 arranged between the pair of magnetic bodies 32a, 32b, to do without the non-magnetic body 40, and this gives advantageous effects that the structure is simplified to have manufacturing costs reduced.

Third Embodiment

Further, a mount bush 10b according to a third embodiment is described.

Figure 6:
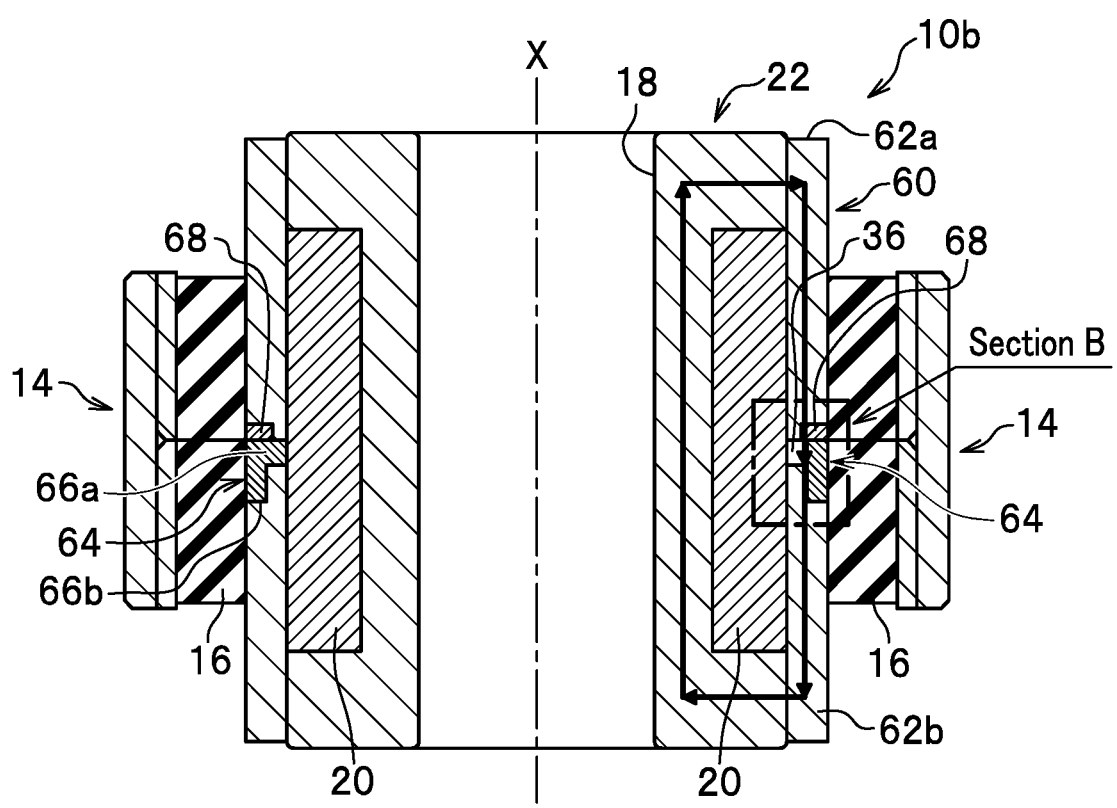
FIG. 6 is a cross-sectional view of a mount bush according to a third embodiment of the present invention, corresponding to those in FIGS. 2 and 5.

The mount bush 10b according to the third embodiment has an outer yoke 60 including a pair of magnetic bodies 62a, 62b away in the direction of the axis X from each other across the communication passage 36, as shown in FIG. 6. A non-magnetic body 64 is held between the pair of magnetic bodies 62a, 62b, except for the communication passage 36.

The non-magnetic body 64 not facing the communication passage 36 has a substantially L shape in cross section taken along the axis X. This part of the non-magnetic body 64 includes an arc top 66a in an arc shape, as viewed in the direction of the axis X, and a downward extension 66b extending downward in the direction of the axis X from a radially outer end of the arc top 66a. This part of the non-magnetic body 64 has a permanent magnet 68 arranged on the arc top 66a thereof at a radially outer end thereof.

Figure 7:
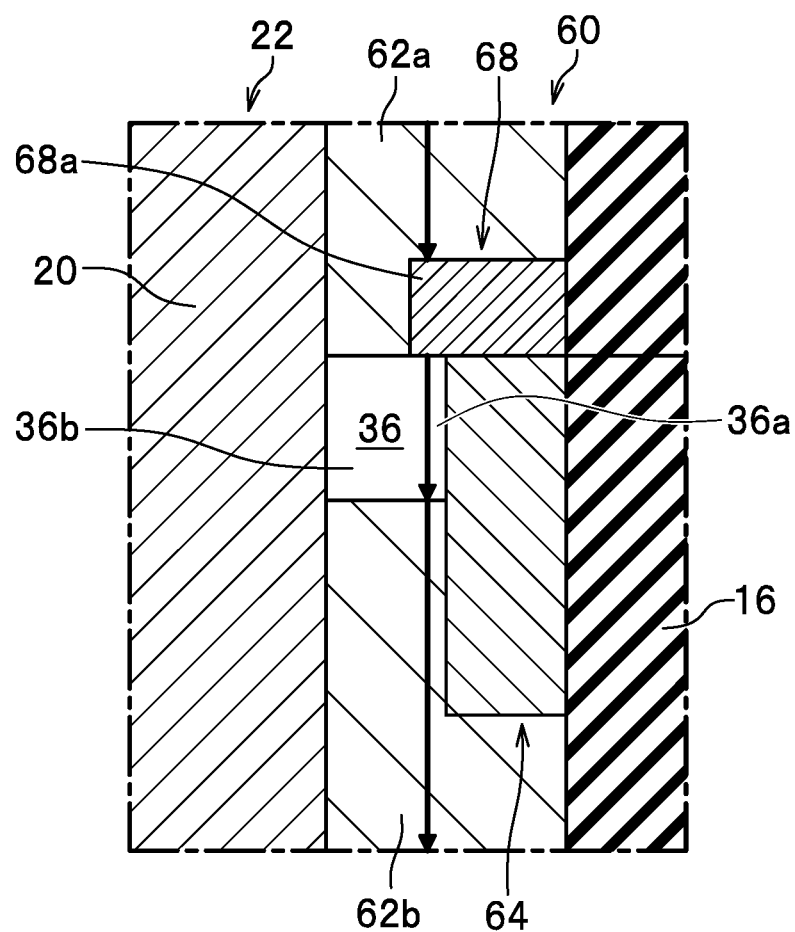
FIG. 7 is an enlarged cross-sectional view of a section B in FIG. 6.

The permanent magnet 68 has a rectangular shape in cross section taken along the axis X, and is arranged between the non-magnetic body 64 and at least one of the pair of magnetic bodies 62a, 62b (upper magnetic body 62a in the example as shown in FIG. 7). The permanent magnet 68 is formed to be an annular body having the same radii (the same inner radius and the same outer radius), about the axis X, all around.

As shown in FIG. 7, a radially inner portion 68a of the permanent magnet 68 is positioned to overlap, in the direction of the axis X, with the communication passage 36. In other words, the permanent magnet 68 is arranged so as to overlap with only a radially outer portion 36a of the communication passage 36.

The third embodiment has the non-magnetic body 64 held between the pair of magnetic bodies 62a, 62b, to improve accuracy of positions between the magnetic bodies 62a, 62b, as compared with a case where a permanent magnet, which is not easily machined, is held between the pair of magnetic bodies.

In addition, the third embodiment has the radially inner end portion 68a of the permanent magnet 68 positioned to overlap in the direction of the axis X with the communication passage 36, to allow for acting a magnetic force of the permanent magnet 68 directly to the communication passage 36. As a result, the third embodiment can more reliably prevent iron powder in the magnetic fluid from being moved.

If the permanent magnet 68 is arranged to overlap in the direction of the axis X with the entire communication passage 36 (all over a radial cross section of the communication passage 36), there is a risk of interrupting a magnetic path generated by the coil 20.

Then, the third embodiment has the permanent magnet 68 arranged so as to overlap with only the radially outer end portion 36a of the communication passage 36 and a remaining portion 36b of the communication passage 36 faces the pair of magnetic bodies 62a, 62b (see FIG. 7). As a result, the third embodiment can act a magnetic path generated by the coil 20 to the communication passage 36.

LIST OF REFERENCE SIGNS

10; 101; 10b: mount bush, 12: inner tubular member, 14: outer tubular member, 16: elastic member, 20: coil, 22: inner yoke, 24; 60: outer yoke, 26: first fluid chamber, 28: second fluid chamber, 30: magnetic fluid, 32a; 32b, 62a; 62b: magnetic body, 36: communication passage, 36a: radially outer portion (of communication passage), 38; 50; 68: permanent magnet, 40; 64: non-magnetic body, 68a: radially inner portion (of permanent magnet), and X: axis.

What is claimed is:

1. A mount bush comprising:
an inner tubular member in a tubular shape;
an outer tubular member in a tubular shape arranged coaxially with the inner tubular member and surrounding an outer periphery of the inner tubular member with a clearance; and
an elastic member connecting the inner tubular member with the outer tubular member,
wherein the inner tubular member includes: an inner yoke in a tubular shape having a coil therein; and an outer yoke in a tubular shape coaxial with the inner yoke and coupled with the inner yoke at a radially outer position than the coil, and
the elastic member has a first fluid chamber and a second fluid chamber, facing each other across an axis of the inner tubular member and having magnetic fluid encapsulated therein, whose viscosity varies by a magnetic field,
wherein the outer yoke has a communication passage communicating the first fluid chamber with the second fluid chamber, and is provided with a permanent magnet to generate a magnetic field in the communication passage.

2. The mount bush according to claim 1, wherein
the outer yoke includes the pair of magnetic bodies, which are away in the direction of the axis of the inner tubular member from each other, across the communication passage, and
the permanent magnet is arranged so as to be held between the pair of magnetic bodies.

3. The mount bush according to claim 2, wherein
only the communication passage and the permanent magnet are arranged between the pair of magnetic bodies.

4. The mount bush according to claim 1, wherein
the outer yoke includes a pair of magnetic bodies, which are away in a direction of an axis of the inner tubular member from each other, across the communication passage,
a non-magnetic body is held between the pair of magnetic bodies, except for the communication passage, and
the permanent magnet is arranged between the non-magnetic body and at least one of the pair of magnetic bodies.

5. The mount bush according to claim 4, wherein
a radially inner portion of the permanent magnet is positioned to overlap, in the direction of the axis of the inner tubular member, with the communication passage.
6. The mount bush according to claim 5, wherein
the permanent magnet is arranged so as to overlap with only a radially outer portion of the communication passage.
7. The mount bush according to claim 1, wherein
a magnetic force of the permanent magnet is smaller than the maximum magnetic force by the coil.
8. The mount bush according to claim 7, wherein
the magnetic force of the permanent magnet is one causing viscosity of the magnetic fluid to be at a midpoint in a variable range of the viscosity.

* * * * *